United States Patent [19]
Stoller et al.

[11] Patent Number: 5,912,460
[45] Date of Patent: Jun. 15, 1999

[54] METHOD FOR DETERMINING FORMATION DENSITY AND FORMATION PHOTO-ELECTRIC FACTOR WITH A MULTI-DETECTOR-GAMMA-RAY TOOL

[75] Inventors: Christian Stoller, Kingwood; Urmi DasGupta; Olivier G. Philip, both of Houston; Nihal I. Wijeyesekera, Stafford, all of Tex.; Peter D. Wraight, Ridgefield, Conn.

[73] Assignee: Schlumberger Technology Corporation, Houston, Tex.

[21] Appl. No.: 08/812,801

[22] Filed: Mar. 6, 1997

[51] Int. Cl.$^6$ ........................................ G01V 5/00
[52] U.S. Cl. .......................................... 250/269.3
[58] Field of Search ............................ 250/269.3

[56] References Cited

U.S. PATENT DOCUMENTS

| | | |
|---|---|---|
| 3,321,625 | 5/1967 | Wahl . |
| 4,048,495 | 9/1977 | Ellis . |
| 4,129,777 | 12/1978 | Wahl et al. . |
| 5,350,925 | 9/1994 | Watson ............................ 250/269.3 |
| 5,390,115 | 2/1995 | Case et al. . |
| 5,525,797 | 6/1996 | Moake . |
| 5,530,243 | 6/1996 | Mathis . |
| 5,596,191 | 1/1997 | Mickael . |
| 5,659,169 | 8/1997 | Mickael . |

*Primary Examiner*—Constantine Hannaher
*Attorney, Agent, or Firm*—Brigitte L. Jeffery; John J. Ryberg

[57] ABSTRACT

An advanced method for determining formation density in an array-detector density tool uses three or more detectors to yield an improved accuracy and precision of the formation density measurement even in the presence of a large standoff between the tool and the formation. A more accurate photoelectric factor is determined through a new single detector algorithm. Use of the information on the photoelectric effect and the density from the three detectors allows the measurement of a photoelectric effect compensated for stand off and the photoelectric factor of the mudcake. The use of the multi-detector density answers allows for a consistency check and therefore a much improved quality control of the density measurement.

26 Claims, 8 Drawing Sheets

△ 0.75-in. STANDOFF
+ 0.5-in. STANDOFF
◇ 0.25-in. STANDOFF
Y 0.125-in. STANDOFF
+ 0-in. STANDOFF

METHOD FOR DETERMINING FORMATION DENSITY AND FORMATION PHOTO-ELECTRIC FACTOR WITH A MULTI-DETECTOR-GAMMA-RAY TOOL

FIELD OF THE INVENTION

This invention relates to the determination of earth formation characteristics. In particular, it relates to the determination of formation density even at an extended standoff between a borehole tool and the formation. The invention also measures the photo-electric factor of a formation and provides better quality control for the density measurement.

BACKGROUND OF THE INVENTION

Nuclear tools have been used for several decades to determine the density of earth rock formations surrounding a borehole. The nuclear density tools rely on the Compton scattering of gamma-rays in the formation for the density measurements. A conventional density tool consists of a source of gamma-rays (or X-rays), at least one gamma-ray detector and shielding between the detector and the source, so that only scattered gamma-rays are detected. During density logging, gamma-rays from the tool source travel through the borehole, into the earth formation. The gamma-rays will be scattered by the electrons in the formation or the borehole and some of them will be scattered back to the detector in the logging tool. Depending on the spacing between the source and detector, the count rate of detected gamma-rays will either increase with increasing formation density (scattering term dominant) or decrease with increasing formation density (attenuation effect predominant). At intermediate spacings, both attenuation and scattering terms influence the response.

In an ideal logging situation, the borehole would have a uniform and straight shape. This uniform borehole would enable a density tool containing a detector to be in close proximity with the formation surrounding the borehole and there would be minimal tool standoff. Under these conditions, one detector would be sufficient for a density measurement.

However, because boreholes normally do not have a uniform and straight shape, one major concern in density logging is the logging tool contact with the borehole wall. Density logging tools can be engineered either as pad tools or as mandrel tools. In a mandrel tool the source and detectors are in the body of the straight cylindrical tool. The long stiff length of such an arrangement renders it difficult for the tool to stay in close contact with a non-uniform borehole wall. In pad tools, the detectors and, in most cases, also the logging source are mounted in a short, articulated pad which can move with respect to the tool body. A strong eccentralizer arm pushes the pad against the borehole wall and allows much better contact because of the much smaller length of the device. All density logging tools will also encounter mudcake built up on the formation wall, which prevents good contact. The density measurement needs to be compensated for this kind of standoff as well. Because of the shortcomings of the mandrel tools, these tools are only used if a pad tool cannot be engineered because of size or cost constraints.

Most modern density tools use an articulated pad which houses the detectors and the gamma-ray source. A backup arm pushes the pad against the formation. The short length of such a pad and the large eccentralizing force exerted by the backup arm assure very good contact of the pad with the formation in most circumstances. However, for tools with a small diameter, the use of a pad type construction becomes difficult or impossible. In these cases, the detectors are placed inside the tool housing (mandrel tool). Eccentralization is provided by a bow-spring and/or a caliper device with a backup arm. However, the much longer stiff length of the tool leads to a poorer application of the tool to the borehole wall and leads to a larger average standoff.

Figure 1:
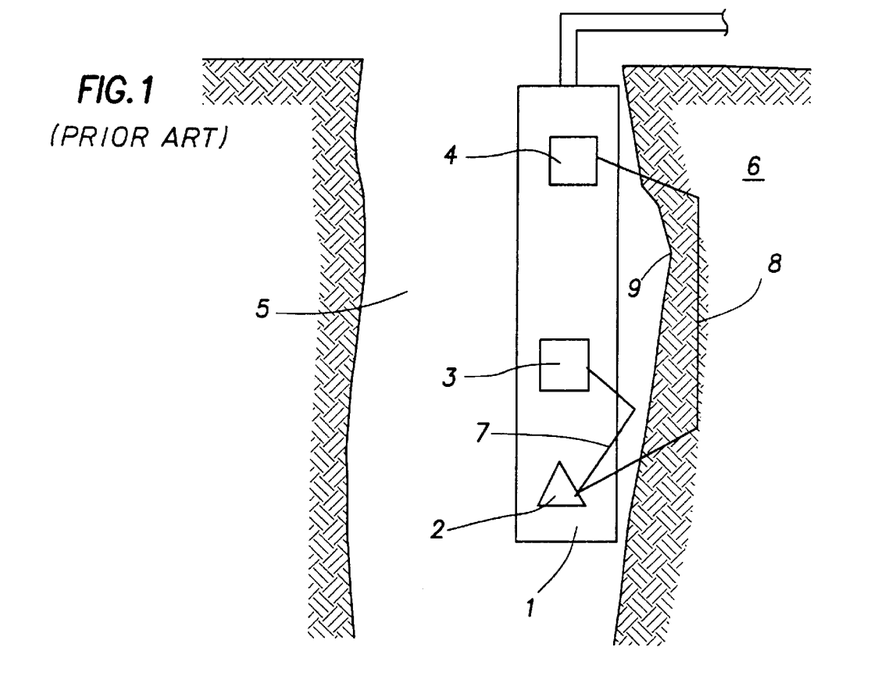
FIG. 1 is a two-detector logging tool at large standoff caused by an irregular shaped borehole.

The basic layout for a two detector tool is shown in FIG. 1. The tool 1 consists of a gamma-ray source 2, a short spaced (SS) detector 3 and a long spaced (LS) detector 4. The tool is in a borehole 5 that is substantially uniform. Gamma-rays emitted from the source 2 go into the borehole and earth formation 6, where they are scattered and some of them are subsequently detected by the detectors. The SS detector 3 is more sensitive to the region close to the tool 7. The LS detector 4 detects gamma-rays 8 from the formation 6 at greater depth than the SS detector and is less sensitive to effects of tool standoff. The apparent density derived from the LS detector measurement can be corrected for tool stand off by comparing the apparent density readings of the LS and SS detectors.

The correction for standoff caused by mudcake build-up or tool standoff can be accomplished by using two detectors with different depths of investigation. In this case, the first detector (SS) has a shallow depth of investigation and is more sensitive to the borehole fluid or mudcake between the tool and the formation. A second detector (LS) at a longer distance from the source is less sensitive to the borehole environment and is more sensitive to the formation. The difference between the two detector readings can be transformed into a correction for standoff and mudcake. However, at larger standoffs due to an irregular borehole shape 9 the 2-detector compensation is often insufficient or ambiguous.

The shortcomings of the 2-detector measurement lie in the fact that the two detector measurement is used to determine three unknowns: Formation density, standoff (distance between the tool and the borehole wall) and the density of the fluid and/or mudcake between the tool and the formation. At small standoffs the latter two unknowns can be combined into an effective thickness (mud density * standoff). At larger standoffs this approach fails and the correction becomes ambiguous. In addition, the short space detector depth of investigation can become smaller than the stand off. This will prevent proper compensation.

As shown in FIG. 1, the irregular shape of the borehole wall 9 causes the tool to be separated from the wall by a large distance. The short space detector 3 depth of investigation is smaller than the standoff and therefore an effective compensation of the density answer of the long space detector 4 is more difficult or nearly impossible to obtain.

Figure 2:
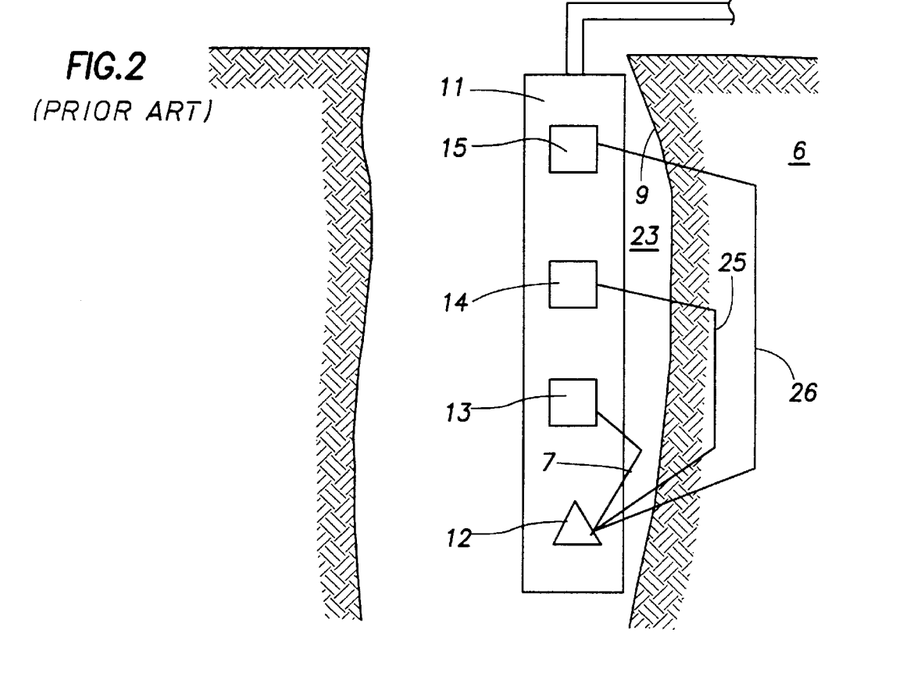
FIG. 2 is a three-detector logging tool at large standoff caused by an irregular shaped borehole.

The use of an additional detector positioned between the traditional LS and SS detectors can help in addressing the ambiguity of the correction at large tool stand off and some of the limitations of the two-detector tool can be overcome. The three-detector measurement provides the ability to distinguish the effect of the mud and/or mudcake thickness from the effect of the density of the mud/or and mudcake between the tool and the formation. In addition, the better statistical precision provided by the middle measurement will improve the logging speed of the tool. The operation of a three-detector tool is shown in FIG. 2. The three-detector tool 11 has the ability to measure three distinct depths of investigation in the formation. The tool has a source 12, and short spaced (SS) 13, middle spaced (MS) 14 and long spaced (LS) 15 detectors. Because of the shape of the borehole wall 9 a very large standoff 23 occurs between the tool 11 and the borehole wall 9. In order to compensate for the effect of this large standoff, at least two detectors must have depths of investigation greater than the tool standoff. Detectors 14 and 15 have depths of investigation, 25 and 26 respectively, that extend into the formation 6 and provide for the measuring of the formation and the material in the region 23 between the tool and the borehole wall.

The idea of using three detectors to differentiate different depths of investigation was described in U.S. Pat. No. 4,129,777 (Wahl). In Wahl, the main idea is to measure the density of material at three different depths from the tool. This can be used for determining formation density though casing, for determining the cement thickness behind casing or for determining mudcake density and thickness between the tool and the formation. In all three cases the measurement is also used to determine the formation density and the thickness and density of the a layer of material between the tool and the formation.

In Wahl, gamma radiation is emitted from the tool into the surrounding media and measurements are taken of the amount of radiation which returns to the detectors as a result of the interaction of the emitted radiation with first, second and third layers respectively of the surrounding media each beginning at the borehole and extending to increasing radial depths. These measurements are taken by three detectors located at different spacings from the gamma radiation source so as to have three different depths of investigation. A representation of the thickness of the solid matter is then obtained from the three gamma radiation measurements.

In particular, the method proposed by Wahl is useful for determining the thickness of the bonding material between a borehole casing and the adjacent formation. In that case, the three gamma radiation measurements (shallow, intermediate and deep) are corrected for the attenuating effect of the casing. Three densities are then computed from the shallow, intermediate and deep radiation measurements respectively.

Another patent incorporating the three detector concept is U.S. Pat. No. 5,525,797, Moake. In this patent, like in Wahl, the gamma-ray source is spaced axially from the first, second and third detectors. The first/near detector is axially spaced from the gamma source by a distance defined as a first spacing. The first spacing and collimation for the first detector are designed so that the gamma-rays detected at the first detector are those gamma-rays that are scattered primarily by the casing.

A second or middle detector is spaced axially farther away from gamma-ray source than the first detector. The second detector is spaced from the gamma-ray source by a distance defined as a second spacing. The second spacing and collimation for the second detector are designed so that the gamma-rays detected at the second detector will be those that are primarily scattered by the casing and the cement. Finally, a third or far detector is spaced axially farther away from the gamma-ray source than both the first and second detectors by a distance defined as a third spacing. The third spacing and collimation defined by the third detector are designed so that the gamma-rays detected at the third detector are those primarily scattered from the casing, cement and formation. It is this third detector that enables the tool to measure formation density while the first and second detectors primarily enable the tool to correct for casing and cement. However, the second detector can be used to measure formation density in the absence of cement.

Preferably, the detectors are shielded by a high density material between the source and the detector that prevents detection of gamma-rays that are simply traveling up through the tool. A pathway or void in the shielding is provided in the form of a collimation channel which extends from the detector through the tool and terminates at the outside surface of the tool. The collimation channels are specifically designed for the detection scheme of each detector. Specifically, the near or first detector will have a collimation that is claimed at a small angle with respect to the casing so that the first detector will detect gamma-rays that are scattered mainly by the casing. The second or middle detector will have a collimation that is directed at a steeper or more perpendicular angle with respect to the casing because the second detector is intended to detect gamma-rays scattered through all of the cement as well as the casing (deeper depth of investigation). Finally, the third or far detector will have a wide collimation channel which is directed substantially perpendicular to the casing due to the distance of the third detector from the source. Because gamma-rays detected at the far detector must pass through the casing, cement, formation before passing back through the cement and casing, the statistical probability of this event happening is smaller than for the first and second detectors and therefore a wider collimation channel is required for the third detector.

The three detector density presented by Wahl describes the general idea of using three detectors to measure density in the presence of a material of substantial thickness and/or density between the tool and the formation. The distinction between different depth of investigation is achieved by the different axial spacing of the detectors.

The invention presented by Moake uses substantially the same detector spacings as the invention of Wahl. The detector collimation is optimized for a through casing measurement. The SS (first) and LS(third) detectors use collimation which is very similar to the one used in traditional two-detector density tools. The MS (middle) detector collimation is very tight and almost perpendicular to the borehole wall to get a deeper density reading in through-casing measurements. The steep collimation angle of the MS detector reduces its count rate and statistical precision. In an open hole measurement the depth of investigation of the MS and LS detectors will become very similar and the sensitivity to mudcake, which has a much smaller density than the steel casing, is reduced.

There remains a need for a solution to determining a correction for standoff in logging tools that can overcome these limitations. One possible approach for a 3-detector algorithm is described in U.S. Pat. No. 5,390,115 (Case and Ellis).

The present invention provides a new multi-detector algorithm optimized for situations in which a density tool encounters substantial standoff from the formation. The method of this invention can be implemented in conjunction with the multi-detector tool described in pending U.S. patent application Ser. No. 08/800,976 (Atty. Docket No. 20.2658) now U.S. Pat. No. 5,841,135 which is incorporated by reference.

In addition to determining formation density, this invention can also measure the photo-electric factor (PEF) of the formation. This measurement relies on the absorption of low energy gamma-rays through the photoelectric effect in the formation. Since the photo-electric effect depends strongly on the atomic number of the formation elements, it provides an indication of the lithology of the formation. Because photoelectric absorption preferentially removes low energy gamma-rays, the tool housing needs to allow passage of low energy gamma-rays to detectors inside the housing. This objective can be accomplished through the use of a window of a material with a low atomic number (Z) in the housing or through the use of a low-Z housing material like titanium. Typical window materials are beryllium and titanium. Housing materials can be titanium or for lower pressure requirements graphite or high-strength carbon compounds.

SUMMARY OF THE INVENTION

It is an object of this invention to provide an optimized means to make a high-quality density measurement in the presence of large tool standoff.

It is another object of the tool to provide an improved, more robust measurement of the photo-electric factor of an earth formation.

It is another object of this invention to provide an improved means for the quality control of the density measurement.

The present invention is an improved method for determining formation density by using an array of gamma-ray detectors. This includes improved standoff correction, better precision and significantly enhanced measurement for photo-electric effect and a more reliable way to ensure the accuracy of the density answer. The detectors have varying depths of investigation into the formation. At small standoffs, the SS detector investigates mainly the mud and mudcake and a shallow layer of the formation. As the standoff increases the SS detector signal is no longer sensitive to the formation or to the mud or mudcake found in close proximity to the formation. The MS detector has a deeper depth of investigation and is sensitive to borehole and formation even at increased tool standoffs. The long spaced (LS) detector is mainly sensitive to the formation density. This LS density reading is corrected by using the information from the MS and SS detectors to provide a more accurate density reading.

The present invention is also an improved method to determine the photoelectric factor (PEF) of the formation. The use of an array of three detectors in a titanium housing provides a high quality PEF answer, which is more precise and more accurate than in traditional two-detector tools.

DETAILED DESCRIPTION OF THE INVENTION

The 3-detector density algorithm relies on the traditional spine-and-ribs approach to the density measurement. However, in order to make full use of the 3-detector tool the spine algorithm was modified and the rib algorithm was adapted to the use of three detectors. The traditional spine algorithm uses the following formulas to determine the apparent density from a single detector measurement. Formula (1) is used for the detectors farther away from the source. Formula (2) for a detector close to the source.

$$RHO_{apparent} = A + B \cdot \ln\left(\frac{W_{hard}}{W_{hard}^{cal}}\right) + C \cdot \ln\left(\frac{W_{soft}}{W_{soft}^{cal}}\right) \quad (1)$$

$$RHO_{apparent} = A + B \cdot \ln\left(\frac{W_{hard}}{W_{hard}^{cal}} \cdot \frac{A_L}{RHO_L}\right) + C \cdot \ln\left(\frac{W_{soft}}{W_{soft}^{cal}}\right) \quad (2)$$

Figure 3:
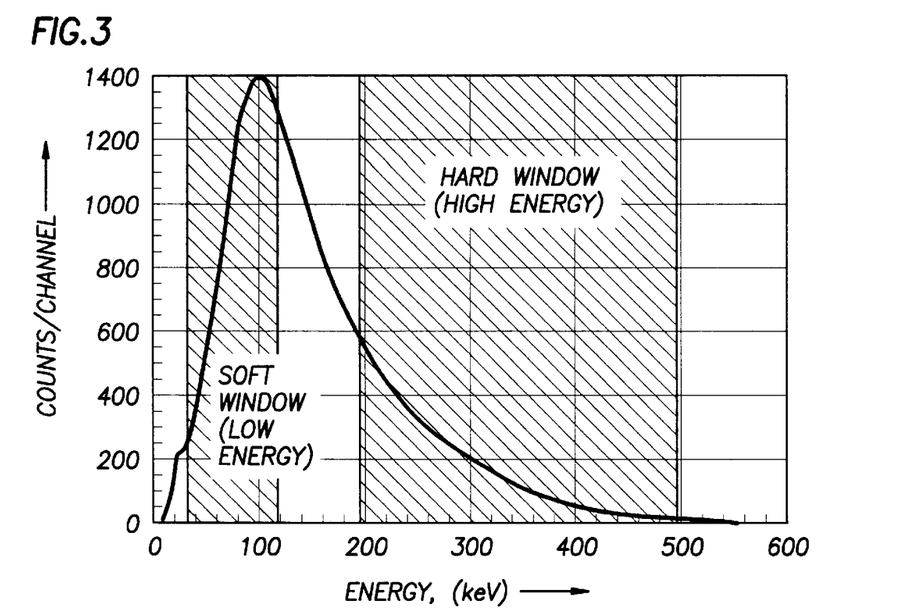
FIG. 3 is a typical gamma-ray spectrum observed in a density tool.

FIG. 3 shows a typical gamma-ray spectrum observed in a density tool. The spectrum is divided in two windows: soft and hard. "Soft" refers to the low energy part of the spectrum in the energy range of about 30 to 120 keV. "Hard" refers to the high energy part of the spectrum about 200 to 500 keV if a $^{137}$Cs source is used for the logging. $RHO_{apparent}$ is the density measured by the single sensor and is not corrected for tool standoff. A is a constant (typically the density of a calibration medium), B is the coefficient for the density sensitivity of the count rate in the high energy window. The high energy window in a typical density tool using a $^{137}$CS source is between 200 and 500 keV, i.e. in the region in which the main gamma-ray interaction is through Compton scattering and not through photoelectric absorption. $W_{hard}$ stands for the count rate in the high energy window. $W^{cal}$ is the equivalent count rate in a calibration measurement. Normalizing to the calibration eliminates small tool-to-tool differences. C is the coefficient of the lithology correction. This correction is needed to eliminate the small biases caused by different lithologies, i.e. by different effective atomic numbers. The sensitivity to this effect is highest at low gamma-ray energies, therefore the correction is based on the low energy window $W_{soft}$ which is normalized by the respective calibration window count rate. Formula (2) uses in addition the term $A_L$ which represents the coefficient A from a detector at a farther spacing and the apparent density $RHO_L$ determined by that farther spaced detector.

The coefficients A, B and C may vary as a function of borehole size. The variation can be described in the form of discrete values at given borehole sizes for which the coefficients have been determined through measurements or modeling, where values for other borehole sizes are obtained through interpolation. It is also possible to describe the values A, B and C as analytical functions of the borehole size.

Figure 4:
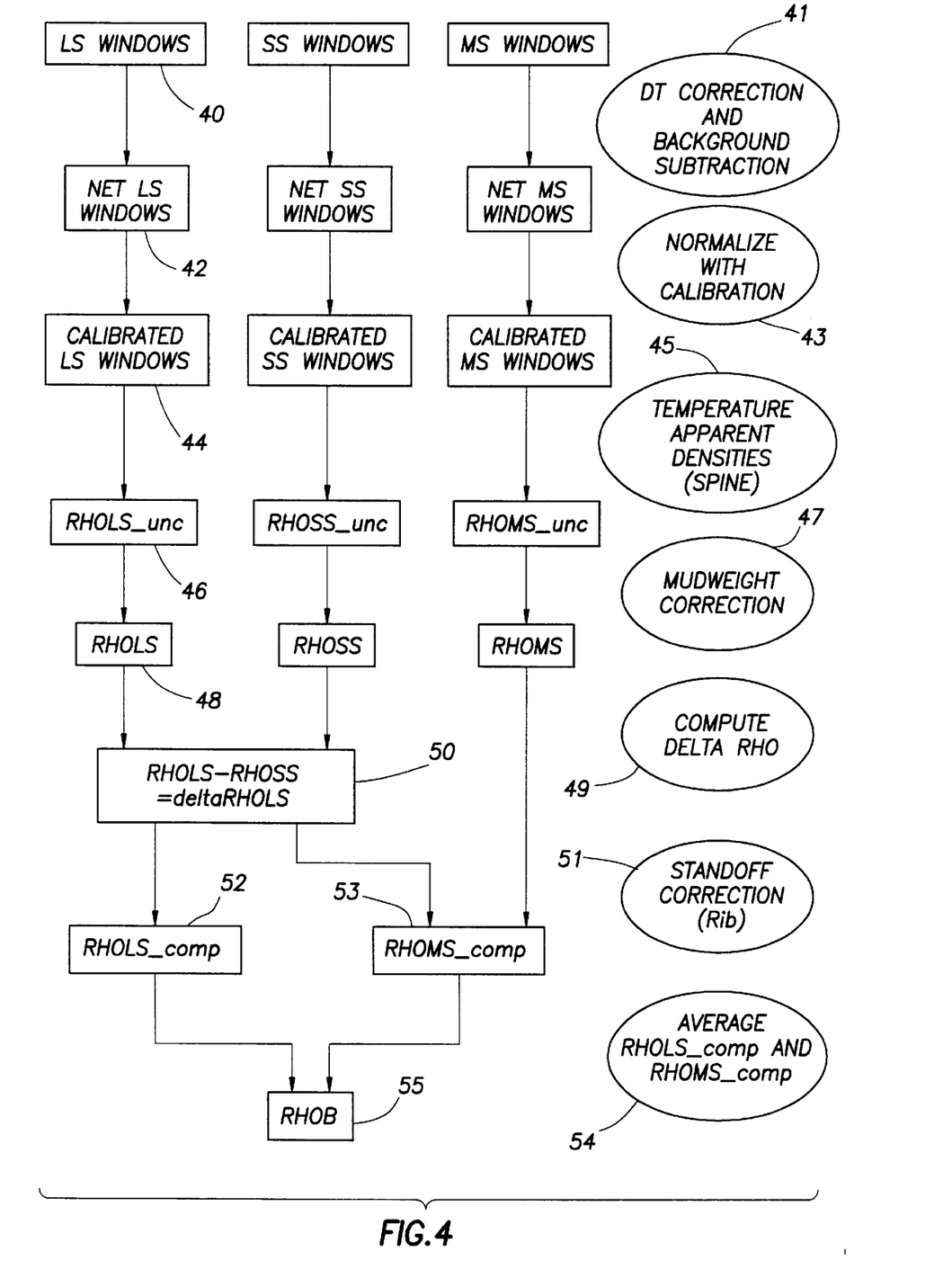
FIG. 4 is the flow diagram of the preferred embodiment of the density algorithm method.

Since the three (or more) detectors in an array density tool have different depths of investigation the true density can be determined by comparing the apparent densities measured by the three (or more) detectors. The preferred approach for determining the density of the earth formation is shown schematically in the flow diagram in FIG. 4. In a first step 40 the soft and hard window count rates are determined for the three detectors (LS, MS and SS). The count rates are then corrected 41 for the effect of electronic dead time and the background spectrum from the gain-stabilization source is subtracted. This background spectrum has been determined previously, before the logging source was inserted in the tool. The resulting "net" count rates 42 are normalized 43 by the count rates from the tool calibration to give the normalized or calibrated window count rates 44. For each detector an apparent density is determined 45 using formula (1 or 2). In addition if necessary, the densities 46 are corrected 47 for the effect of temperature on the net count rates. Since the density of the mudweight affects the gamma-ray transport the apparent densities have to be corrected 47 for the mud-density (mud-weight). The temperature correction 47 can be done as shown in formula (3), where the correction is a linear function of the difference between the tool temperature $T_{tool}$ and a reference temperature $T_{ref}$. The latter is t. The latter is typically the temperature at which the tool is calibrated. $\gamma$ is the temperature coefficient of the density measurement.

$$RHO_{corr} = RHO_{uncorr} \cdot \{1 + \gamma \cdot (T_{tool} - T_{ref})\} \quad (3)$$

These corrections produce a corrected density 48. A possible mudweight correction is shown in formula (4), where $\rho_{mud}$ is the density of the mud in the borehole, Bhs is the diameter of the borehole, dia is the tool diameter and $M_1$, $M_2$ and $M_3$ are coefficients determined through experiment and/or modeling.

$$RHO_{corr} = RHO_{uncorr} \cdot (1 - M_1(\rho_{mud}-1) \cdot (Bhs-dia)^{M_2} \cdot e^{M_3 \cdot RHO_{uncorr}}) \quad (4)$$

This step is followed by the determination of a correction term $deltaRHOLS_{available}$, 49 which is the difference between the long-spaced and the short-spaced density 50. This difference is indicative of the effect of the tool standoff 51. A correction based on this difference $deltaRHOLS_{available}$ is then applied to obtain the LS 52 and MS 53 compensated densities. The correction is a monotonic function of $deltaRHO_{LSavailable}$ and the standoff-corrected density is determined as shown in formula (5). The compensated LS 52 and MS 53 densities are then averaged 54 to give the bulk density RHOB 55.

$$RHOLS\text{-}corr = RHOLS\text{-}uncorr + f(deltaRHOLS_{available}) \quad (5)$$

Figure 5A:
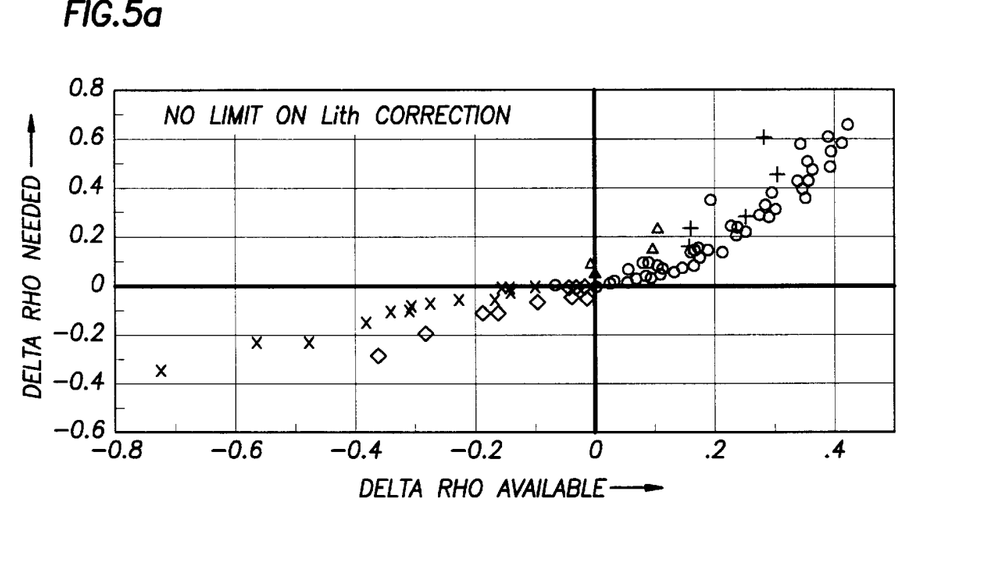
FIGS. 5a and 5b show the basis for the density compensation algorithm and the need to limit the lithology correction.

$f(deltaRHOLS_{available})$ can be an analytical function or it can be described by a sequence of straight line segments (segmented rib). FIG. 5a shows the correlation between the needed correction $deltaRHO_{needed}$ and the available correction $deltaRHOLS_{available}$. The data points in the figure represent many measurements taken at densities from 1.7 to 3.1 g/cm³ with simulated mudcakes of varying thickness and density. Most points follow a trend line but some points deviate significantly. This is due to the photoelectric effect of the mudcake or borehole fluid which is overcorrected in equation (1). "Soft" gamma-rays are not very penetrating and are strongly affected by the presence of elements with a high atomic number Z in their path. Formula (1) corrects for the effect of the photoelectric factor of the formation. However, if the gamma-rays travel through high-Z borehole material (heavy mud and heavy mudcake) the correction will be too large and the density answer will become inaccurate. This invention therefore limits the "soft" correction to obtain an accurate answer even in heavy mud. The result is shown in formula (6).

$$RHO_{apparent} = A + B \cdot \ln\left(\frac{W_{hard}}{W_{hard}^{cal}}\right) + C \cdot \ln\left(\text{Max}\left(\frac{W_{soft}}{W_{soft}^{cal}}, \beta \cdot \frac{W_{hard}}{W_{hard}^{cal}}\right)\right) \quad (6)$$

Figure 5B:
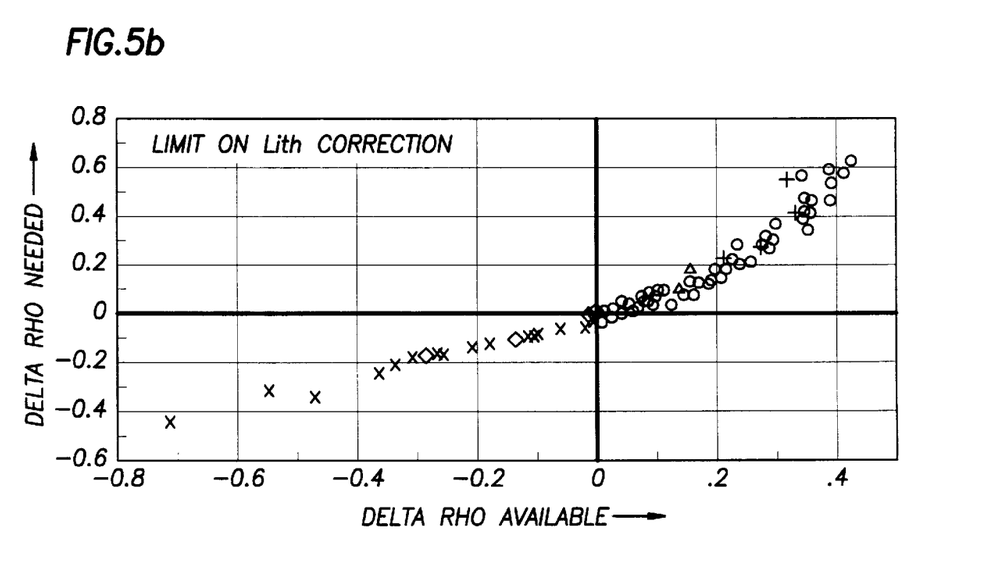

$\beta$ is the coefficient determining the minimum value that the $W_{soft}$ needs to have compared to the high energy window $W_{hard}$. The effect of this correction is shown in FIGS. 5a and 5b. FIG. 5a shows the needed density correction (deltaRHO needed) as a function of the difference between the LS and SS apparent densities ($deltaRHOLS_{available}$) without the limit on the density correction. FIG. 5b shows the same data including the limit on the lithology correction. The data points are labeled according to the photoelectric factor of the mud and/or mudcake. The apparent density of the mid-spacing detector can be corrected in the same way as the long-spaced density. The preferred embodiment uses $deltaRHOLS_{available}$ which is determined from the difference of the long-spaced and short-spaced densities as shown in formula (7).

$$RHOMS\text{-}corr = RHOMS\text{-}uncorr + g(deltaRHO_{LSavailable}) \quad (7)$$

Figure 6A:
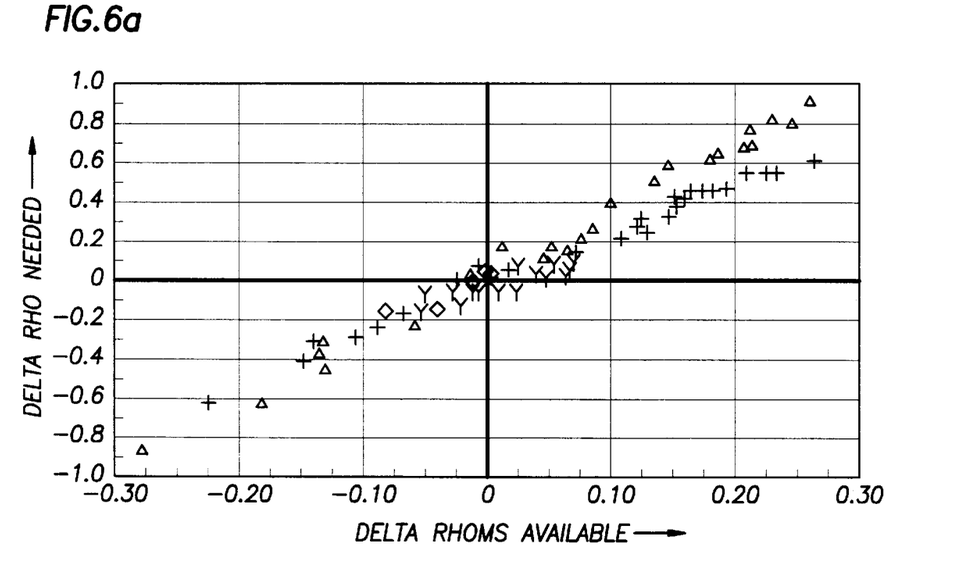
FIGS. 6a and 6b show the mid-spacing density compensation data.
Figure 6B:
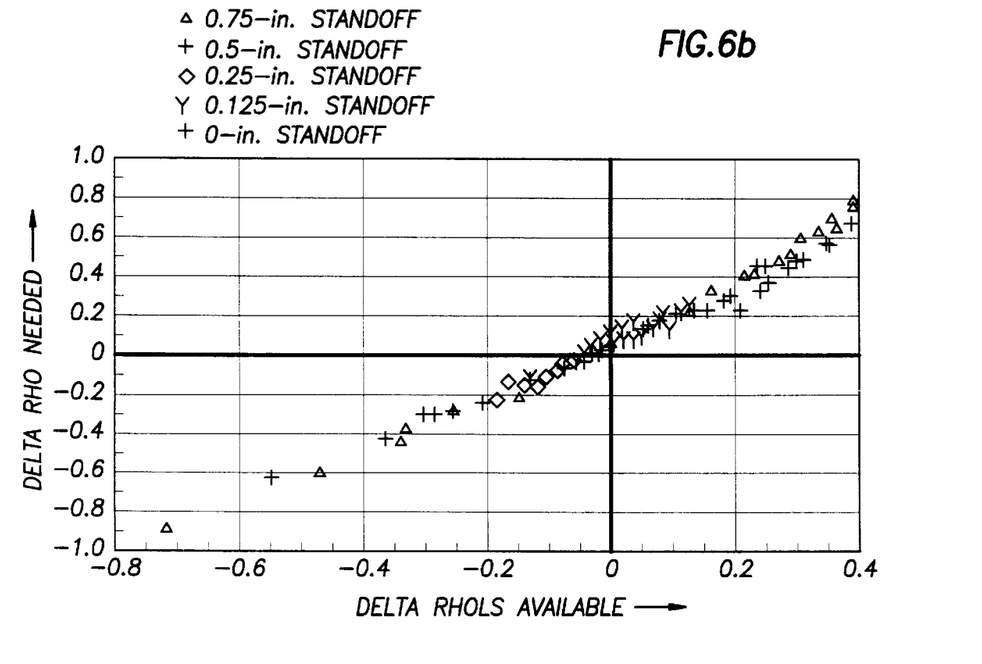

The function for the MS correction is different from the one of the LS detector. The reason for preferably using $deltaRHOLS_{available}$ is shown in FIGS. 6a and 6b. The plot FIG. 6a of $deltaRHOLS_{available}$ versus the needed correction $deltaRHOMS_{needed}$ shows a much smaller dispersion FIG. 6a than if $deltaRHOMS_{available}$ is used. The fact that the data points of the plot FIG. 6a, fall on different lines as a function of the stand off of the tool can be used for additional corrections at large stand off. In the preferred embodiment the final density answer is obtained as the simple average of the compensated LS and MS densities as shown in formula (8a).

$$RHO_{final} = (RHOLS_{corrected} + RHOMS_{corrected})/2. \quad (8a)$$

$$RHO_{final} = (c1 \cdot RHOLS_{corrected} + c2 \cdot RHOMS_{corrected}) \quad (8b)$$

A weighted average as shown in equation (8b), where c1+c2=1 can be used, too. and it is possible to further correct the density based on the difference between the compensated MS and LS densities as shown in formula (9):

$$RHO_{final} = (RHOLS_{corrected} + RHOMS_{corrected})/2. + h(RHOLS_{corrected} - RHOMS_{corrected}) \quad (9)$$

Other implementations of the algorithm are possible. In particular, the correction for borehole size and mudweight can also be performed on the final density answer $RHOB_{final}$ instead of on the apparent single detector densities.

The photoelectric effect affects mainly the low energy (soft) gamma-rays, while the high-energy (hard) window is affected almost exclusively by the density of the formation. It is therefore tempting to use the ratio of soft/hard gamma-rays as a measure of the photoelectric factor of the formation.

The traditional PEF algorithm relies on the formula shown in equation (10). It uses the fact that low energy gamma-rays are much more affected by gamma-ray absorption through the photoelectric effect than high energy gamma-rays. Taking the ratio between the number of counts in a low energy window (<120 keV) and a high energy window (>200 keV) is an indication of the photoelectric effect of the formation.

$$\frac{1}{PEF + C} = A \frac{W_{soft}}{W_{hard}} + B \quad (10)$$

This equation works well with tools using beryllium windows to allow low energy gamma-rays to travel from the formation to the detector with minimal scattering or absorption. In this case a window at very low energy (e.g. 30 to 70 keV) can be used. The count rate in this window is dominated by the influence of the photoelectric effect. If a titanium housing is used the gamma-rays at very low energy (30 to 60 keV) are strongly absorbed in the housing material. This requires the use of an energy window which includes higher energy gamma-rays to obtain a sufficiently precise answer. However, the count rate in this window is more affected by the formation density. This shows in cases where the PEF is high at a low density. This density effect can be corrected in a simple and elegant manner by a slight change of equation (10). The resulting equation (11) is shown below:

$$\frac{1}{PEF+C} = A \frac{W_{soft}}{(W_{hard})^\alpha} + B \qquad (11)$$

Figure 7A:
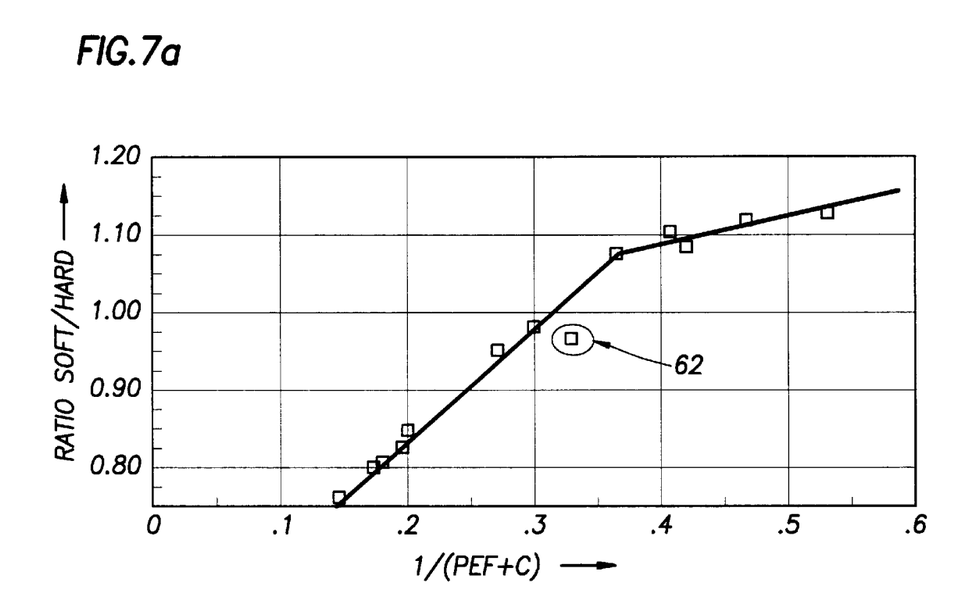
FIGS. 7a and 7b show a comparison between the traditional and the improved algorithm for determining Pef.
Figure 7B:
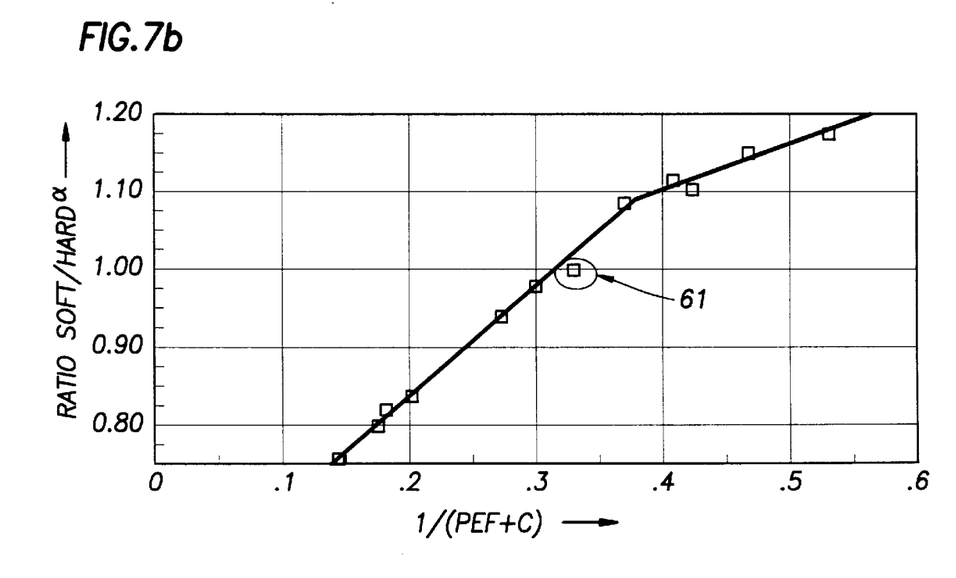

The change consists of taking a power $\alpha$ of the count rate in the density window before forming the soft-hard ratio. If this power $\alpha$ is less than 1.0 then the effect of density is reduced. FIGS. 7a and 7b show an actual example of both approaches. In FIG. 7a there is one point 60 which has low density and high PEF that does not follow the obvious trend when the two sides of equation (10) are plotted against each other. In FIG. 7b, equation (11) with $\alpha$=0.94 is used. Point 61 also with low density and high PEF is in better agreement with the general trend. PEF can therefore be derived from the count rates as shown in equation (12).

$$PEF = \frac{1}{A\frac{W_{soft}}{W_{hard}^\alpha} + B} - C \qquad (12)$$

The coefficients A, B and C can be functions of the borehole size. In particular in the preferred embodiment the coefficient A can be written as $$A = A_0 * (1 - const * (borehole\ size - tool\ diameter)) \qquad (13)$$

where const is a small number. This allows correction for the effect of the borehole fluid between the tool and the formation even if the tool is in good contact with the formation. If there is a significant mismatch between the curvature of the tool and the borehole only gamma-rays entering on the line where the tool touches the formation will not encounter borehole fluid in their path. The amount of borehole fluid traversed on average by the gamma-rays increases with increasing curvature mismatch. If uncorrected, this leads to a bias in the answer. If two detectors are used to determine the PEF of the formation and if the two detectors subtend significantly different azimuthal angles the fact that the average path length of the gamma-rays through the borehole fluid varies can be used to correct for the effect of the PEF of the borehole fluid.

Figure 8:
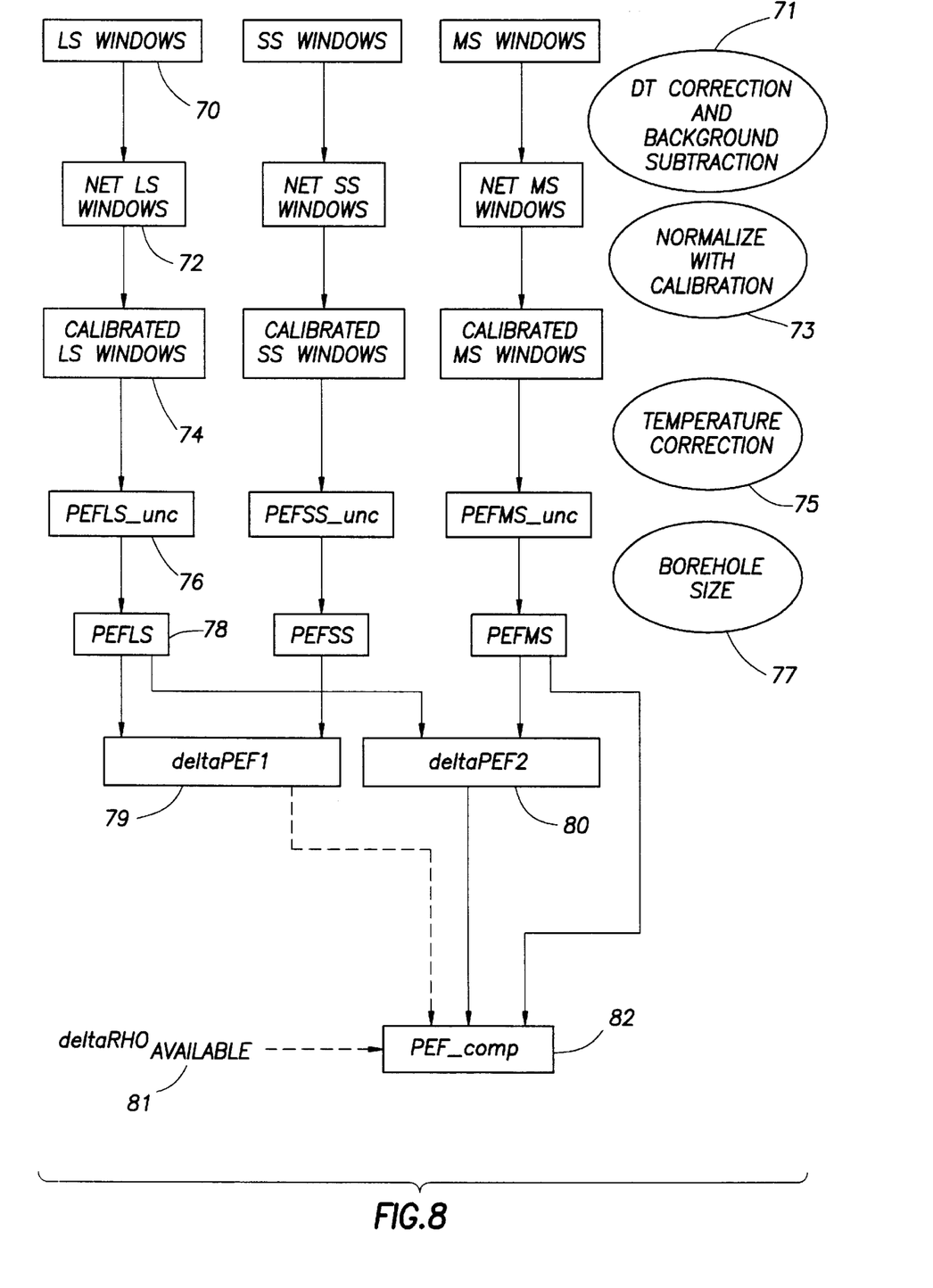
FIG. 8 is the flow diagram of the algorithm to determine Pef.

FIG. 8 shows the various steps needed to determine the photoelectric factor from the gamma-ray spectra. In a first step 70 which is the same for each detector, the gamma-ray count rate spectrum measured by each detector is acquired and divided into at least two windows ("soft" and "hard"). In a second step 71 the window count rates are corrected for count rate losses due to electronic deadtime and the background window count rates from the detector stabilization source are subtracted. In a third step 73 the net window count rates are normalized 73 (calibrated) by the respective net window count rates from the tool calibration. This gives the calibrated window count rates 74, which are corrected for tool temperature 75. In a forth step the single detector photoelectric effect is determined according to equation (12), where some or all coefficients (A, B, C) can be functions of the borehole size 77 and/or mudweight. If PEF is measured by more than one detector, the resulting single detector PEFs 78 can be combined in steps 79 and 80 to obtain a PEF 82 which is compensated for the photoelectric effect of the mud and the tool stand off. To accomplish this additional information such as deltaRHO$_{available}$ 81 may need to be added to the computation.

PEF can be determined from all the detectors in the array. This allows two things:

Compensation for the density and photoelectric effect of the mudcake and for standoff.

Quality control by comparing the photoelectric factors determined by two or more detectors.

Compensation for mudcake and standoff is dissimilar from compensation for density. The difference of PEF between two detectors depends on the collimation of the detectors, the standoff and the density and photoelectric factor of the mud or mudcake. The corrected Pef is therefore not only a function of the difference in Pef between two detectors, it also depends on the measured density and the difference dRHO between the single detector densities.

$$PEF\_corr = PEF + g(dPEF, dRHO, PEF\ and\ RHO) \qquad (14)$$

PEF is the single detector density computed from one of the detectors, dRHO is the difference between the LS and SS or MS and SS single detector densities and dPEF is the difference between the PEF of two detectors. RHO can be the corrected density or on of the single detector densities.

In density logging it is possible that situations arise in which the answer is inaccurate or wrong. It is important to have quality controls which indicate when the tool answer is no longer reliable.

The use of an array of three or more detectors makes it possible to use the consistency between the responses of the detectors to indicated situations in which the tool is not able to give a reliable answer or to indicate a failure in the tool. Traditional (two-detector) density tools rely on single detector quality checks (quality ratios) and the size of the correction applied in the spine-and-rib algorithm to infer the validity of the results. However, deltaRHO$_{available}$ is not an unambiguous quality indicator since it can wrongly indicate good data, even if the tool is experiencing excessive standoff. A combination of answers from the three detectors is a more accurate and suitable way to detect and indicate bad data quality. It is based on the following quantities, which are derived from the apparent densities measured by the three detectors.

$$dMS = (RHOMS - RHOSS_{high})/RHOLS \qquad (15)$$

$$dLS = (RHOLS - RHOSS_{med})/RHOLS \qquad (16)$$

Figure 9:
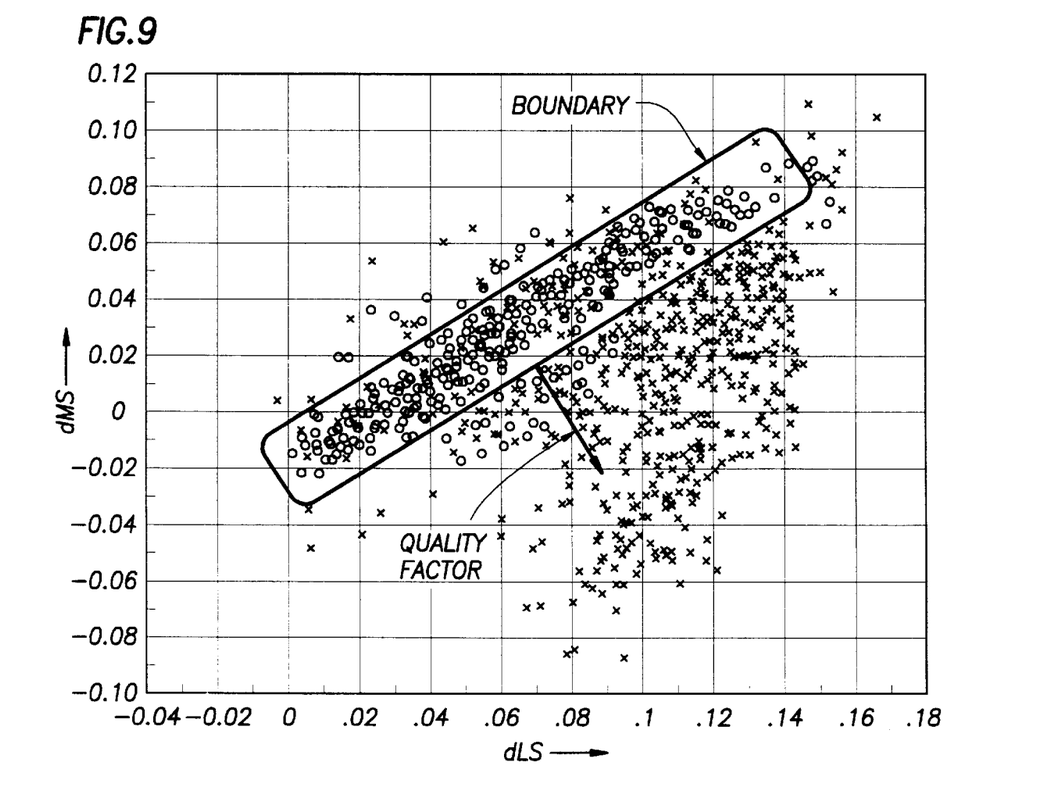
FIG. 9 shows the data underlying the algorithm for the density quality control.

If the quantities (1) and (2) above are plotted against each other one obtains the plot shown in FIG. 9. RHOMS is the apparent mid-spaced density (corrected for the effect of borehole size and mudweight), RHOLS is the apparent long spaced density. RHOSS$_{med}$ denotes the apparent short-spaced density from a gamma-ray energy window which lies in the middle of the spectrum (around 300 keV for a tool using a $^{137}$Cs source). RHOSS$_{high}$ refers to a higher energy window (about 400 keV). The position of the energy windows needs to be determined through experiment and modeling for any particular array density tool.

Figure 10:
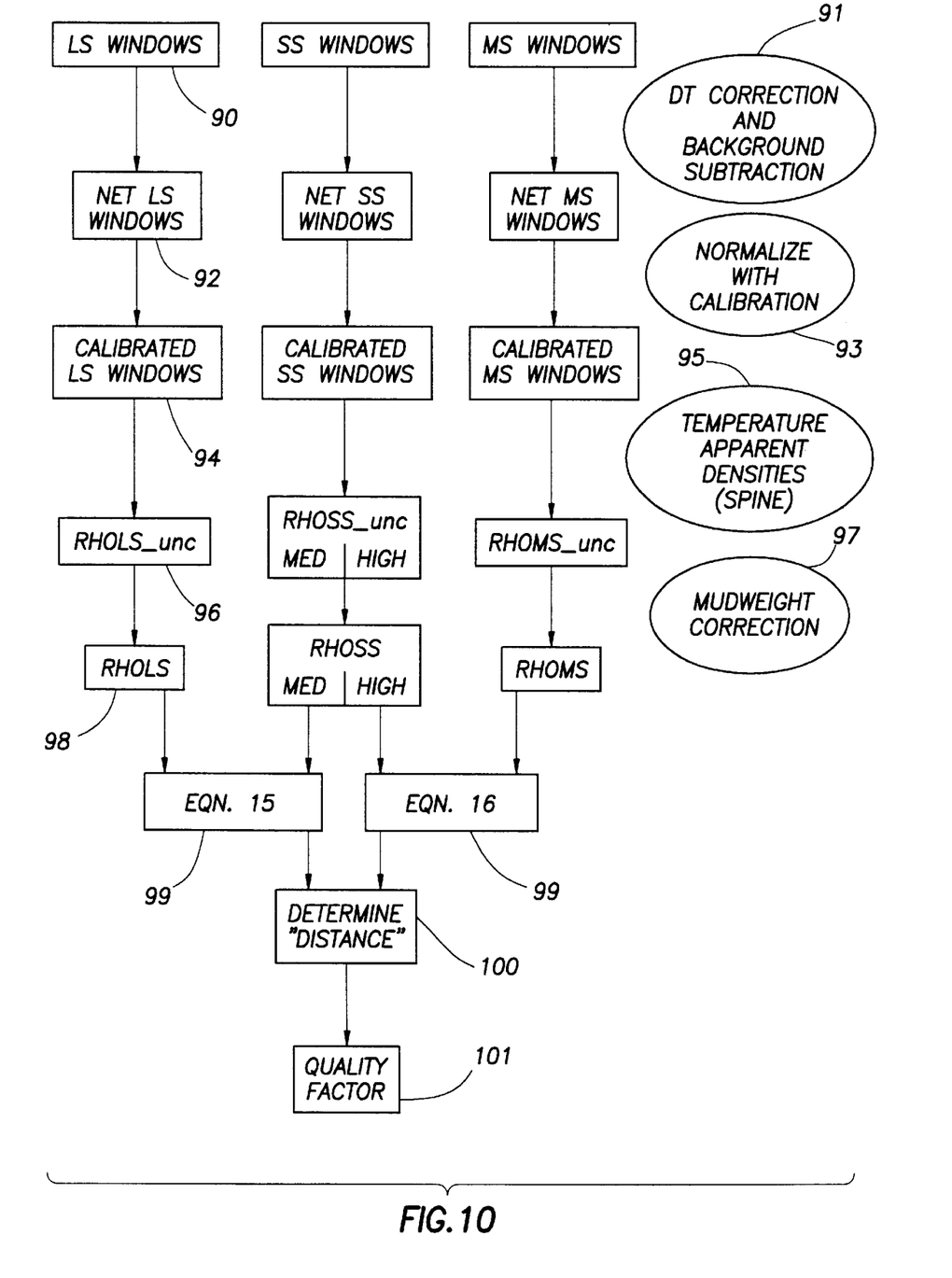
FIG. 10 is the flow diagram for the determination of the density quality factor.

The quality factor is determined as described in FIG. 10. The first four steps 90 through 97 are the same as in the density algorithm and serve to determine the four or more apparent single detector densities 96 which are corrected for mudweight 97 producing corrected densities 98. In the sixth step 99 the ratios of equations 15 and 16 are determined. In a seventh step 100 it is determined if the set of the two ratios falls into a predetermined region in the crossplot. The quality factor 101 is then determined as the distance of the data points from the boundary of the predetermined region. Distances which are inside the boundary are arbitrarily called positive and those outside the boundary negative. A negative quality factor then indicates questionable or bad data.

Compared to the density processing two apparent densities are determined from the short-spaced detector calibrated window count rates. This is indicative of the fact that different energies of the scattered gamma-rays also correspond to different depths of investigation. The selection of the appropriated energy windows, which may differ from the ones used for the density algorithm has to be done through experiment and modeling.

The methods of this invention provide significant advantages over the current art. The invention has been described in connection with its preferred embodiments. However, it is not limited thereto. Changes, variations and modifications to the basic design may be made without departing from the inventive concepts in this invention. In addition, these changes, variations and modifications would be obvious to those skilled in the art having the benefit of the foregoing teachings. All such changes, variations and modifications are intended to be within the scope of the invention which is limited only by the following claims.

We claim:

1. A method for determining characteristics of an earth formation surrounding a borehole comprising the steps of:
   a) irradiating said earth formation with a source of gamma-rays or X-rays;
   b) providing at least three detectors at fixed successively greater distances from said source, said detectors being capable of generating signals used to derive a gamma-ray spectrum indicative of the energy of the gamma radiation detected by each of the detectors;
   c) dividing said gamma-ray spectrum into a plurality of windows for each detector, said windows containing a gamma-ray count rate and being representative of different gamma-ray energies;
   d) correcting said gamma-ray count rates for deadtime;
   e) determining a single detector density measurement at each detector; and
   f) computing a corrected density from the density at said detectors.

2. The method of claim 1 wherein a said gamma-ray spectrum is detected at each of three detectors, said detectors being positioned from a downhole source such that there is a short spaced detector, a middle spaced detector and a long spaced detector.

3. The method of claim 2 wherein after step (d) the count rate is corrected by subtracting stabilization source background from said count rate.

4. The method of claim 3 further comprising after step (d) the step of normalizing the count rate in each window to obtain a calibrated window count rate.

5. The method of claim 2 further comprising after step (d) the step of correcting each of said density measurements for borehole effects.

6. The method of claim 2 further comprising after step (e) limiting a lithology correction term according to:

$$RHO_{apparent} = A + B \cdot \ln\left(\frac{W_{hard}}{W_{hard}^{cal}}\right) + C \cdot \ln\left(\text{Max}\left(\frac{W_{soft}}{W_{soft}^{cal}}, \beta \cdot \frac{W_{hard}}{W_{hard}^{cal}}\right)\right),$$

where $RHO_{apparent}$ is the single detector density measurement, $W_{hard}$ is a count rate for a high energy portion of the gamma-ray spectrum, $W_{soft}$ is a count rate for a low energy portion of the gamma-ray spectrum, $W^{cal}$ is a count rate for a calibration measurement, A is a constant, B is a density sensitivity coefficient for the high energy portion of the gamma-ray spectrum, and C is a lithology correction coefficient.

7. The method of claim 6 further comprising the step of computing a difference between the density measured by the middle spaced and short spaced detectors.

8. The method of claim 7 further comprising the step of correcting the middle spaced detector density measurement by adding a fraction of said difference to said middle spaced density measurement.

9. The method of claim 6 wherein said corrected density is computed as:

$$RHOB = (a \times RHOLS) + (b \times RHOMS) + (c \times RHOSS),$$

where RHOB is the corrected density RHOLS is the long spaced detector density measurement, RHOMS is the middle spaced detector density measurement, RHOSS is the short spaced detector density measurement and constants a, b, and c are a function of RHOLS–RHOSS and RHOMS–RHOSS.

10. The method of claim 2 further comprising in step (e) correcting the density for mudweight and detector temperature.

11. The method of claim 6 further comprising the step of computing a difference between the density measured by the long spaced and short spaced detectors.

12. The method of claim 11 wherein said formation density measurement of said long spaced detector is corrected by adding a fraction of said difference to said long spaced density measurement.

13. The method of claim 11 wherein said formation density measurement of said middle spaced detector is corrected by adding a fraction of said difference to said middle spaced density measurement.

14. The method of claim 2 further comprising the steps of:
   determining a difference between said long spaced density measurement and said short spaced density measurement;
   correcting said long spaced density measurement by applying said difference to said long spaced density measurement to obtain a corrected long spaced density measurement RHOLS(corrected);
   correcting said middle spaced density measurement by applying said difference to said middle spaced density measurement to obtain a corrected middle spaced density measurement RHOMS(corrected); and
   computing a corrected density RHOB from either {RHOLS(corrected)+RHOMS(corrected)}/2 or {c1×RHOLS(corrected)+RHOMS(corrected)+c2×RHOMS(corrected)}, where c1+c2=1, or {RHOLS(corrected)+RHOMS(corrected)}/2+f{RHOLS(corrected)−RHOMS(corrected)}, where f is a function determined from calibration measurements and modeling.

15. A method for determining characteristics of an earth formation surrounding a borehole comprising the steps of:
   a) irradiating said earth formation with gamma-rays or X-rays;

b) providing at least one detector being capable of generating signals used to derive a gamma-ray spectrum indicative of the energy of the gamma radiation detected;

c) dividing said detected gamma-ray spectrum into a plurality of windows for each detector, said windows containing a gamma-ray count rate and being representative of different gamma-ray energies;

d) correcting said gamma-ray count rates for deadtime;

e) computing a ratio of soft gamma-rays (low energy) to hard gamma-rays (high energy), where before computing the ratio the hard gamma-ray count rate is raised to a power $\alpha$, where $\alpha$ is a value between 0.5 and 1.0 obtained from measurements or modeling; and f) computing a photoelectric factor of the formation.

16. The method of claim 15 wherein after step (d) the count rate is corrected by subtracting stabilization source background from said count rate.

17. The method of claim 16 further comprising before step (e) the step of determining coefficients for the photoelectric factor computation from the borehole size.

18. The method of claim 16 further comprising before step (e) the step of determining coefficients for the photoelectric factor according to a formula obtained by measurements and modeling.

19. The method of claim 15 further comprising after step (c) the step of normalizing the count rate in each window to obtain a calibrated window count rate.

20. A method for determining characteristics of an earth formation surrounding a borehole wherein gamma-rays are detected at at least three detectors positioned in said borehole and spaced at increasing distances from a gamma-ray or X-ray source, where said detector closest to said source is a short spaced (SS) detector, said detector that is second closest is a middle spaced detector (MS) and said detector that is farthest from said source is a long spaced (LS) detector and comprising the steps of:

a) detecting gamma-rays at said detectors positioned in the borehole and dividing said detected gamma-ray spectrum into a plurality of windows in each detector, said windows containing a count of gamma-rays and being representative of different gamma-ray energies;

b) determining a formation density at each of said detectors where RHOLS is the density measurement from the long spaced detector, RHOMS is the density measurement from the middle spaced detector, RHOSS (med) is the density measurement from the short spaced detector medium energy window and RHOSS(high) is the density from the short spaced detector high energy window;

c) computing a long spaced detector density difference from the equation dLS=RHOLS-RHOSS(med)

and a middle spaced detector density difference from the equation dMS=RHOMS-RHOSS(high)

and generating a plot of dLS and dMS;

d) defining a region in a dLS-dMS crossplot which is representative of accurate data and a boundary of said region;

e) computing a quality factor (QRHO) which is determined as the distance of the (dLS, dMS) pair from the boundary; and f) computing a density correction based on said quality factor.

21. The method of claim 20 wherein said corrected density (RHOB') equals RHOB+f(QRHO) where f is a function determined from measurements and modeling.

22. A method for determining the photoelectric factor of an earth formation surrounding a borehole wherein gamma-rays are detected at at least three detectors positioned in said borehole and spaced at increasing distances from a gamma-ray or X-ray source, where said detector closest to said source is a short spaced (SS) detector, said detector that is second closest is a middle spaced detector (MS) and said detector that is farthest from said source is a long spaced (LS) detector and comprising the steps of:

a) determining density at each of said detectors, where RHOL is from said long spaced detector and RHO2 is from said short spaced detector;

b) determining photoelectric factor from at least two of said detectors, where PEF1 is from said long spaced detector and PEF2 is from either middle or short spaced detector;

c) determining a compensated formation density (RHOB);

d) computing the difference (dPEF) between said PEF1 and PEF2;

e) computing the difference between a first and a second detector density, dRHO=RHOL-RHO2; and f) computing a corrected photoelectric factor using parameters dPEF and dRHO.

23. The method of claim 22 further comprising after step (d) the step of computing a corrected first detector PEF from said dPEF and said first detector PEF.

24. The method of claim 22 wherein said corrected PEF is computed from;

Pef1(corr)=Pef1+$g$(dPEF, dRHO, Pef1, RHOL).

25. The method of claim 22 further comprising after step (d) the step of computing a corrected second detector PEF from said dPEF and said second detector PEF.

26. The method of claim 22 wherein said corrected second detector PEF is computed from;

Pef2(corr)=Pef2+$g$(dPEF, dRHO, Pef2, RHO1).

* * * * *